(12) United States Patent
Grieves et al.

(10) Patent No.: US 8,166,001 B1
(45) Date of Patent: Apr. 24, 2012

(54) MAPPING REGULATIONS AND FRAMEWORKS TO POLICIES USING CONTROL STATEMENTS

(75) Inventors: Jay J. Grieves, Katy, TX (US); Brandon S. Dunlap, Houston, TX (US)

(73) Assignee: Symantec Corporation, Mountain View, CA (US)

( * ) Notice: Subject to any disclaimer, the term of this patent is extended or adjusted under 35 U.S.C. 154(b) by 1022 days.

(21) Appl. No.: 11/771,796

(22) Filed: Jun. 29, 2007

Related U.S. Application Data

(60) Provisional application No. 60/817,928, filed on Jun. 30, 2006.

(51) Int. Cl.
*G06F 7/00* (2006.01)
(52) U.S. Cl. ........................................................ 707/694
(58) Field of Classification Search ........................ None
See application file for complete search history.

(56) References Cited

U.S. PATENT DOCUMENTS

| | | | |
|---|---|---|---|
| 2004/0117407 A1* | 6/2004 | Kumar et al. | 707/200 |
| 2004/0172634 A1* | 9/2004 | Honda et al. | 718/104 |
| 2006/0161879 A1* | 7/2006 | Lubrecht et al. | 717/101 |
| 2007/0242607 A1* | 10/2007 | Sadler et al. | 370/238 |

* cited by examiner

*Primary Examiner* — Belinda Xue
(74) *Attorney, Agent, or Firm* — Campbell Stephenson LLP

(57) ABSTRACT

A method, system and apparatus for mapping of internal corporate policies to operational guidelines, such as regulations, best practice frameworks, and standards, through the use of control statements are provided. In one embodiment, a set of normalized control statements are linked to best practice framework control objectives and regulations pertinent to an organization. The control statements are also linked to an organization's policies; thereby providing a mapping via the control statements between the regulations and best practices those policies are intended to satisfy. Other embodiments provide for a mechanism for organizing, maintaining, tracking, and displaying control statements and the associated operational guidelines.

17 Claims, 8 Drawing Sheets

MAPPING REGULATIONS AND FRAMEWORKS TO POLICIES USING CONTROL STATEMENTS

CROSS-REFERENCE TO RELATED APPLICATIONS

The present patent application claims priority to U.S. Patent Application No. 60/817,928, filed on Jun. 30, 2006, entitled "Mapping Regulations and Frameworks to Policies Using Control Statements", which is incorporated herein by reference in entirety.

FIELD OF THE INVENTION

The present invention relates to organizational policy management, and, more particularly, linking organizational policies to associated regulations and industry best practices frameworks through the definition and use of control statements.

BACKGROUND OF THE INVENTION

Tasks related to gathering, analysis and storage of data are central to the business of many organizations. Governmental regulations related to security and privacy of such data are propounded in order to cause organizations to demonstrate "due care" in providing appropriate information technology controls that assure security and privacy of information assets and protect those assets from damage or misuse. Such regulations, however, are typically vague with regard to implementation details, which are left to policy-making individuals within the affected organizations.

In order to provide guidance to organizations within particular industries, industry groups may provide best practices frameworks. Typical best practices frameworks provide accepted standards of practice in complying with governmental regulations. Thus, compliance with a best practices framework can be evidence of due care taken by an organization within the associated industry for complying with a regulation. Examples of such best practices frameworks include, for example, ISO 17799 associated with the Health Insurance Portability and Accountability Act (HIPAA) and Control Objectives for Information and Related Technology (COBIT) associated with the Sarbanes-Oxley Act. Best practices frameworks typically provide accepted codes of practice, measures, indicators and processes for the related industry and the related regulations.

Business entities within an industry formulate policies to comply with the various regulations and best practices frameworks affecting that industry. But in order to determine whether a company's policies comply with all related regulations and best practices often requires a complex audit. Such an audit involves a review of all policies in light of each regulation and best practices framework. Such audits can require significant time and resources of a business entity in order to determine compliance, and need to be periodically repeated to ensure continued compliance and compliance with new regulations. Finally, given the targeted nature of regulations and best practices for different areas of concern, there is a high likelihood of duplication of effort in formulating and abiding by policies associated with each individual set of regulations or best practices frameworks.

What is therefore desirable is a mechanism for simplifying association of corporate policies with associated regulations and best practice frameworks. It is further desirable that such a mechanism permit determination of coverage of regulations and best practices by particular policies during an implementation phase of the policies, rather than during an audit phase. It is also desirable to have a mechanism that permits reduction of duplication of effort in formulating and implementing policies by permitting policies to be associated with multiple regulations or best practices.

SUMMARY OF THE INVENTION

Embodiments of the present invention provide a mechanism for simplifying association of corporate policies with regulations and best practices frameworks associated with the organization's relevant industry. Such functionality is provided through the use of control statements that serve as an interface between relevant regulations and best practices frameworks and an organization's internal policies that implement those regulations and best practices frameworks. Embodiments of control statements provide an unambiguous definition of what is expected of a policy in order to satisfy one or more regulations and best practices frameworks associated with the control statement. Embodiments of control statements thus remove ambiguity of what needs to be implemented by an organization while at the same time leaving implementation details open to the particular environment of an organization through the use of policies.

BRIEF DESCRIPTION OF THE DRAWINGS

The present invention may be better understood, and its numerous objects, features and advantages made apparent to those skilled in the art by referencing the accompanying drawings.

FIGS. 4a-4d illustrate a graphical user interface for management of control statements and policies, in accord with embodiments of the present invention.

DETAILED DESCRIPTION

Embodiments of the present invention provide a method and system for mapping of internal policies to regulations and best practice frameworks through the use of control statements. In one embodiment, a set of normalized control statements are linked to best practice framework control objectives and regulations pertinent to an organization. The control statements are also linked to an organization's policies; thereby providing a mapping via the control statements between the regulations and best practices those policies are intended to satisfy. Other embodiments provide for a mechanism for organizing, maintaining, tracking, and displaying control statements and the associated policies, frameworks, and regulations.

In securing the various data of an organization, organizations need to demonstrate due care in providing appropriate policies covering information technology. Such policies assure security and privacy of the organization's information assets and protect those assets from damage or misuse. Guidance for the types of information technology policies to be instituted can be found in operational guidelines such as regulations and industry best practices.

Regulatory compliance can require and organization to abide by all manner of legal obligations and regulations, either legislative or industry-specific. Such regulations can include new and emerging regulations propounded by a government body, laws, industry-specific rules, industry standards, legal judgments, and contracts. A regulatory landscape includes all of the above types of regulations. For information technology, important regulations include the Sarbanes-Oxley Act (SOX), the Federal Information Security Management Act (FISMA), the Health Insurance Portability and Accountability Act (HIPAA), the Gramm-Leach Bliley Act (GLBA), and the Revised International Capital Framework (Basel II). Parts of each of these acts can implicate information technology policies for relevant organizations.

Many regulations have a companion best practices framework. Best practices frameworks are typically propounded by industry organizations and are used to compare organizational operations with known standards of practice. Compliance with best practices frameworks can be evidence of due care being taken to comply with associated regulations. Examples of common best practices frameworks include: ISO 17799 associated with HIPAA, the Control Objectives for Information and Related Technology (COBIT) associated with the Sarbanes-Oxley Act, and NIST SP800-53 (Recommended Security Controls for Federal Information Systems) associated with FISMA.

Figure 1A:
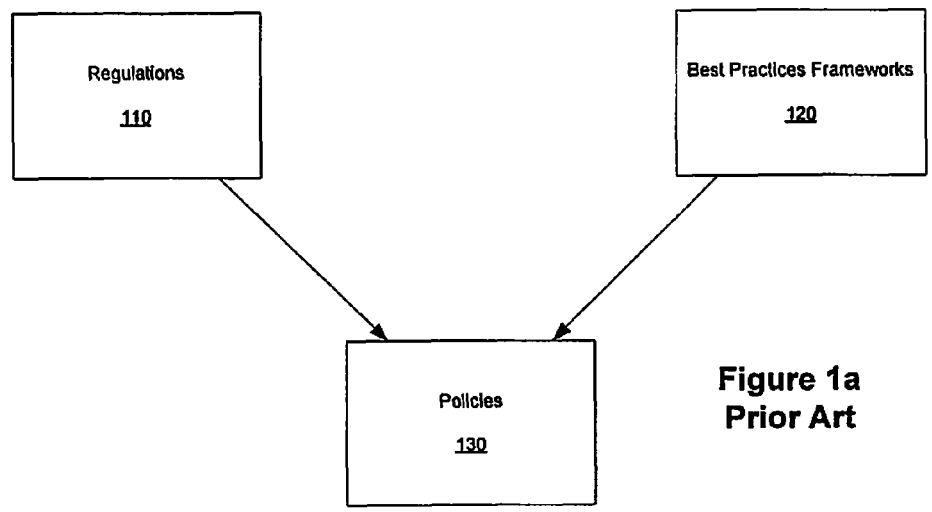
FIG. 1A is a simplified block diagram illustrating a relationship between regulations and best practices frameworks with an organization's policies intended to be used to implement the regulations and best practices frameworks.

FIG. 1A is a simplified block diagram illustrating a relationship between regulations 110, best practices frameworks 120, and an organization's policies 130 intended to implement the regulations and best practices frameworks. In a typical process, an organization conducts an internal review of each regulation 110 and categorizes assets of the organization to determine any applicability of the regulation to those assets. An organization can also identify practices from the best practices framework 120 that are favored by the industry for implementing the applicable regulations. An organization can then define policies 130 through which the regulations and/or best practices framework can be implemented. Subsequently, the organization may perform an audit of the policies to determine a state of compliance of the regulations and best practices framework.

A drawback of the above process is that the process is often implemented independently for each set of regulations and in isolation from one another. Such a process typically increases a duplication of effort and cost by developing, implementing, and tracking overlapping policies for the various regulations and best practices.

Figure 1B:
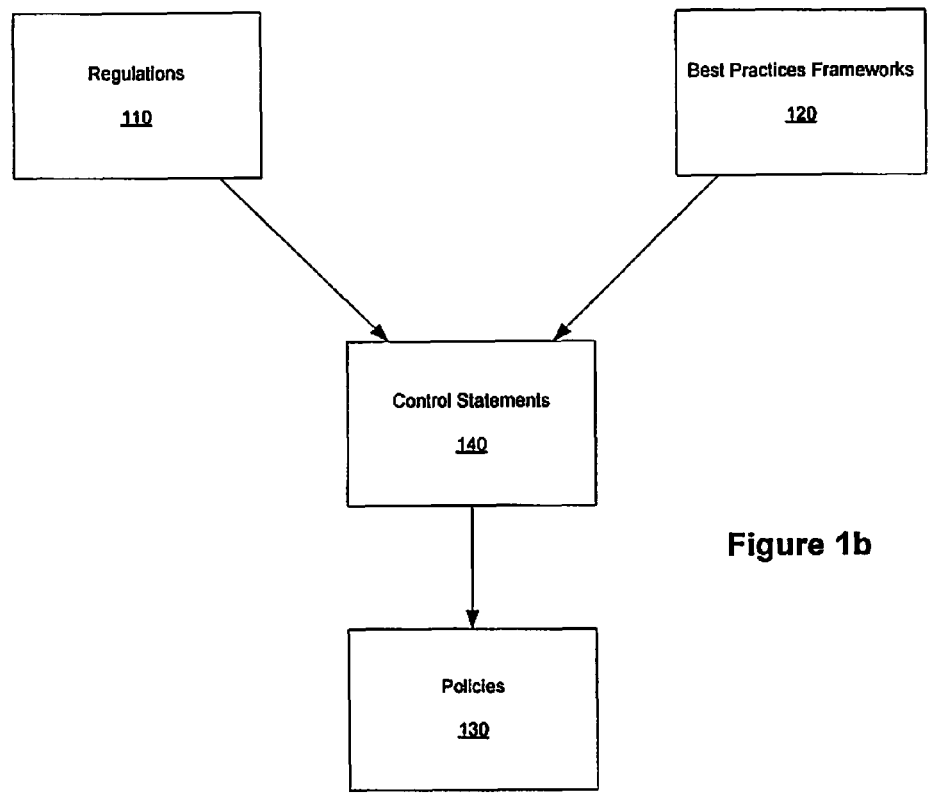
FIG. 1B is a simplified block diagram of implementing regulations and best practices frameworks using an embodiment of the present invention.

FIG. 1B is a simplified block diagram illustrating a relationship between regulations, best practices frameworks, control statements, and an organization's policies using embodiments of the present invention. It should be noted that control statements can be used to interface other "regulation-like" industry practices such as standards from standard-setting bodies. As illustrated with FIG. 1A, regulations 110 and best practices 120 drive an organization to implement policies 130 in order to demonstrate due care in providing appropriate information technology controls for information assets. But rather than directly relating policies to regulations and best practices frameworks, a set of control statements 140 are defined in light of the regulations and best practices framework. Control statements 140 then become an interface between an organization's policies, and the related frameworks and regulations. Control statements map the regulatory landscape, which is a general set of directives, to specific and defensible expectations for an organization to follow in creating internal policies.

Control statements provide a higher level of detail to guide implementation of regulations than typical best practices frameworks. But the use of control statements also leaves details related to implementation open to a particular situation faced by an organization, through the creation of policies. Because control statements are mapped to regulations and/or best practices, if a policy is drafted to fulfill a control statement, then that policy also satisfies the requirements of the related regulation or best practice.

Control statements can be characterized in several ways. For example, control statements can include operational policy control statements and technical control statements. Operational policy control statements include expected behavior for individuals and the operational processes they must follow. Operational policy control statements can include, for example, security incident response procedures. Technical control statements include control statements that can be technically automated or enforced across an information technology structure. Technical control statements include, for example, password policies, secure configuration and protection of server controls. Control statements in other contexts can be described as directive, preventative, detective, corrective, and recovery statements.

Figure 2:
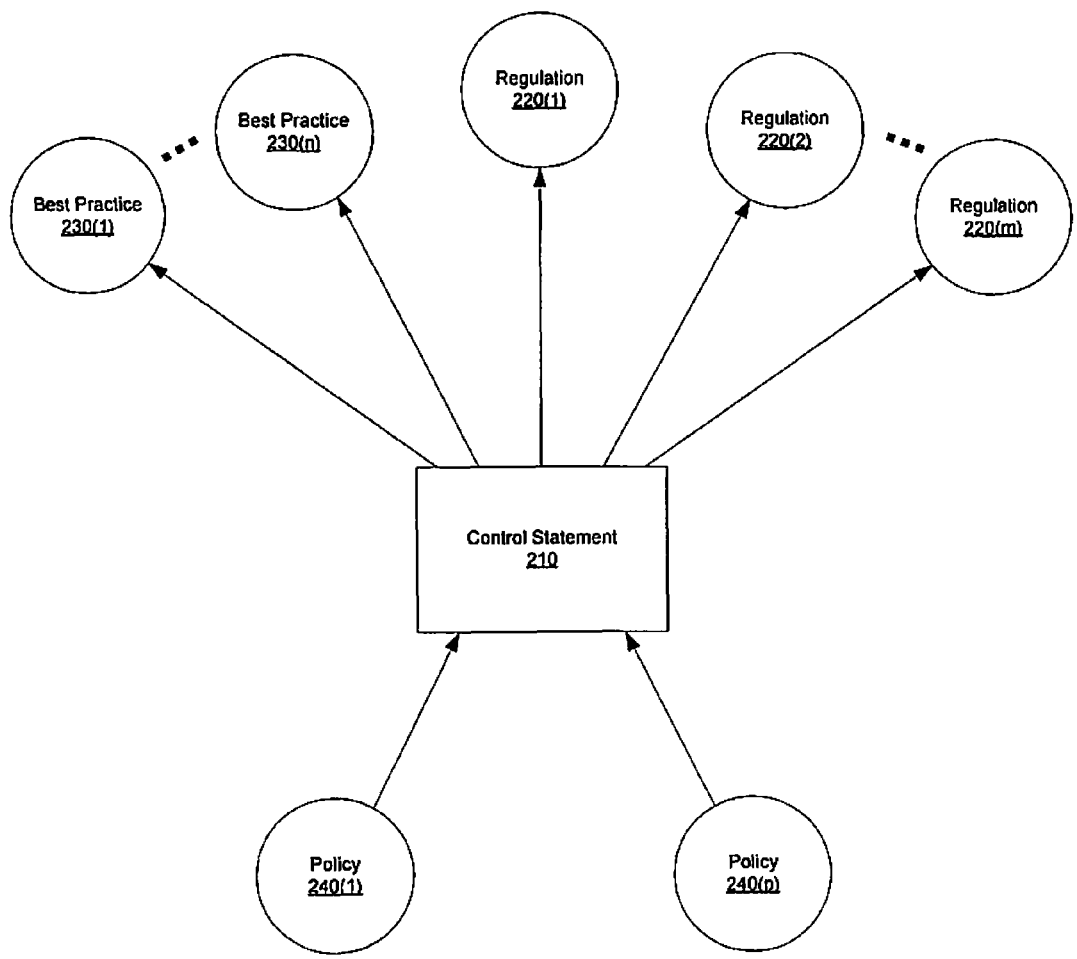
FIG. 2 is a simplified block diagram illustrating a relationship between a control statement and associated regulations, best practices and policies in accord with embodiments of the present invention.

FIG. 2 is a simplified block diagram illustrating a relationship between a control statement and associated regulations, best practices and policies in accord with embodiments of the present invention. FIG. 2 illustrates how a control statement 210 can be associated with multiple regulations 220(1)-220(m) and best practices 230(1)-230(n) and be implemented by one or more policies 240(1)-240(p). In order to make control statements a useful tool in ensuring security compliance of an organization, embodiments of control statements incorporate features such as atomicity, normalization, transparency, obviousness, comprehensiveness, and the ability to function as an interface contract. These features combine aspects of relational database theory, market indexing, and software engineering in the functionality of control statements.

Control statements implement the concept of atomicity by having each control statement convey a single concept that is defined and understandable with minimal external definition. Thus, a policy can be implemented by looking to a control statement alone, rather than requiring an internal review of each regulation.

Control statements are also normalized in order to reduce repetition of concepts found in regulations and best practice frameworks. Normalization is accomplished by first reducing a set of concepts found in a regulation or best practice to a collection of atomic units (conveying a single concept defined and understandable on its own). Once concepts are compiled for each appropriate regulation and best practice, each concept is then related back to the sets of regulations and best practices in order to ensure comprehensive coverage of each applicable regulation and best practice.

In this manner, any defined policy related to a control statement will also be related through that control statement to all connected regulations and best practices. Further, to the degree that multiple regulations or best practices implicate a particular concept, that concept need only be represented by a single control statement and any policies related to that control statement will also be related to all appropriate regulations and best practices.

In order for a control statement to be accepted as a benchmark for a regulation or best practice, the control statement should be transparent. Thus, the source material (e.g., the text of the regulation or best practice associated with the control statement) should be readily available to a user or auditor of the control statement as well as any theory behind the creation of the control statement. The meaning behind a control statement should also be obvious to a user; that is, the control statement should be understandable and believable. Users, auditors and other interested parties should be able to understand a control statement and believe that the control statement represents the applicable regulations and best practices concepts to which the control statement is mapped.

Control statements should also be comprehensive in the regulation and best practice content claimed to be covered by the control statement. Any logically defined segment of a regulation or best practice that is covered, should be covered comprehensively. A test for comprehensive coverage is that satisfaction of all control statements for a given logical segment of a regulation or best practice translates into satisfaction of the segment itself.

Control statements function as an interface contract separating the definitions of compliance expectations and the actual implementing of such compliance. A control statement is a well-defined way of relating policies to the regulations and best practices those policies are written to fulfill. Once a control statement is related to a regulation or a best practice, the control statement becomes the expectation for a policy and is therefore immutable. Thus, if a policy fulfills the control statement, then the policy fulfills the related regulations and best practices. As an organization implements different processes over time, policies may change, but as long as those policies continue to fulfill the control statement, the interface contract remains intact.

Figure 3:
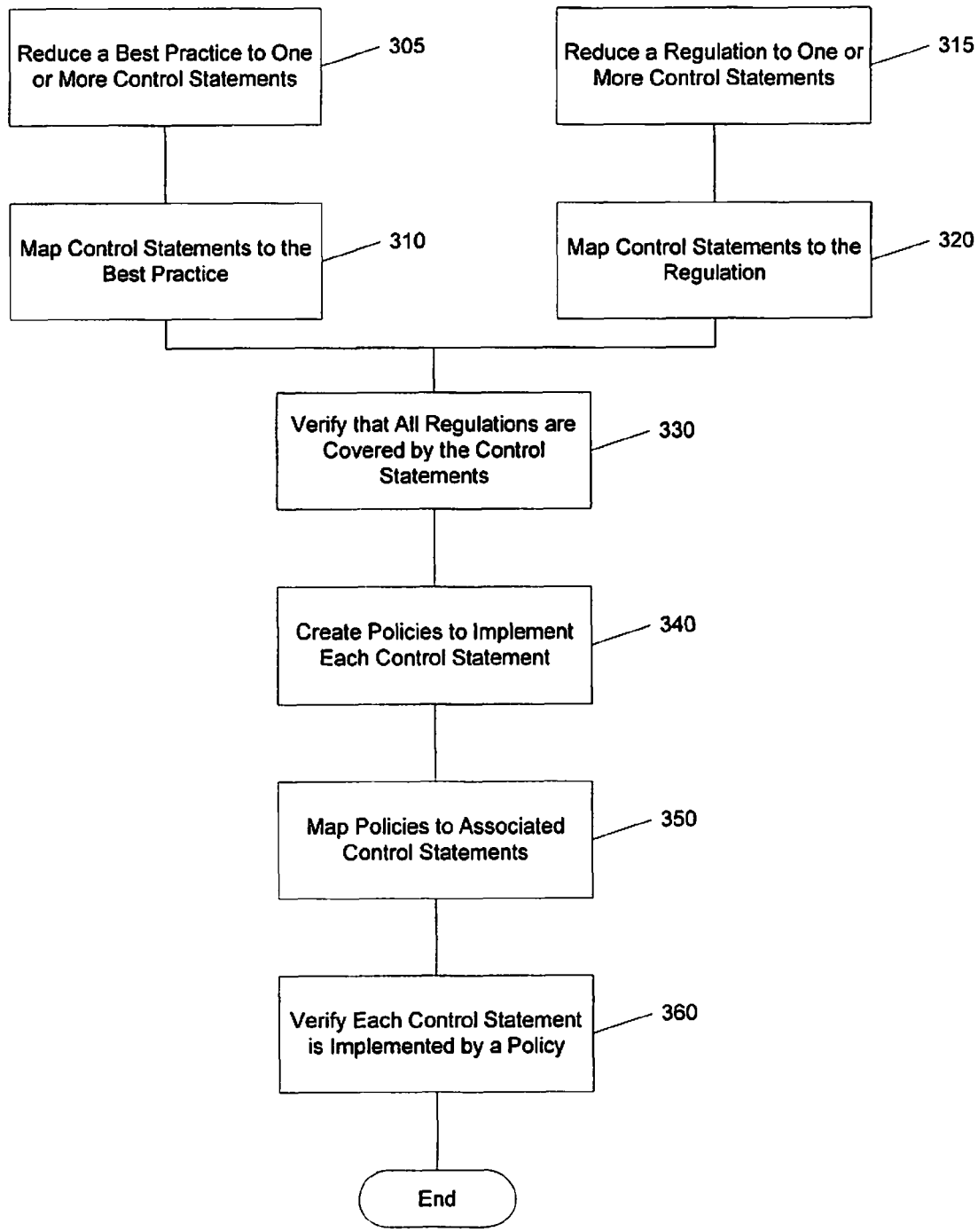
FIG. 3 is a simplified flow diagram illustrating a process for creation of policies in accord with embodiments of the present invention.

FIG. 3 is a simplified flow diagram illustrating a process for creating policies associated with, for example, regulations and best practice frameworks through the use of control statements, in accord with embodiments of the present invention. Initially, control statements are formulated from associated regulations and best practices. Formulation of control statements can be performed by either reducing best practices in a best practice framework to one or more control statements (305) and mapping the control statements to the associated best practice (310) or reducing a regulation to one or more control statements (315) and mapping the control statements to the associated regulation (320). Reducing and mapping of regulations and best practices provides aspects of the atomicity and normalization associated with control statements. The control statements can be stored in a computer storage area, as can be a record of the mapping of the control statement to an identified regulation or best practice. The record of the mapping is associated with the control statement record by, for example, a pointer or related records in a relational database. Once the applicable regulations and best practices have been reduced and mapped to control statements, verification is performed to determine whether all regulations are indeed covered by the control statements (330). If not, then additional control statements are formulated to correspond to the uncovered regulations and best practices.

Using the set of formulated control statements, policies can be created in an organization to implement each control statement (340). Policies can correspond to one or more control statements and one or more policies can correspond to a single control statement. A mapping is maintained defining a relationship between each policy and its associated control statements (350). Policies and their related mappings can be stored in a computer storage area and records of a policy and its related map are linked, for example, as records in a relational database. The mapping is used to verify whether each control statement is implemented by a policy (360).

Verification 360 can be performed, for example, visually through the use of a graphical user interface that provides an indication of whether a control statement has an associated policy. Such an interface can also provide an indication of the relationship between a policy and the regulations or best practices associated with the control statement to which the policy is mapped. Such an indication of relationships can provide aspects of the transparency and comprehensiveness features of control statements discussed above.

Figure 4A:

Management of control statements and policies can be provided through the use of a graphical user interface, an example of which is illustrated in FIGS. 4a-d. FIG. 4a illustrates a policy browser window that provides a user access to defined policies and allows a user to create new policies, embodying aspects of the present invention. Task selection area 405 enables the user to perform tasks, including, for example, making a new policy, publishing a policy, mapping a policy, and other tasks related to analyzing data collected from the enterprise related to compliance with policies. Browsing area 410 enables a user to select working copies or published copies of policies for review and editing. Policies can be differentiated as "working" or "published" depending upon whether the policy is under development or is intended to be complied with. Working policies can have a status such as "draft," "in review," "reviewed," and "approved." Policies with which members of the enterprise should comply can have a "published" status and are available for provision to the various members or entities within the enterprise responsible for enacting such compliance.

Figure 4B:
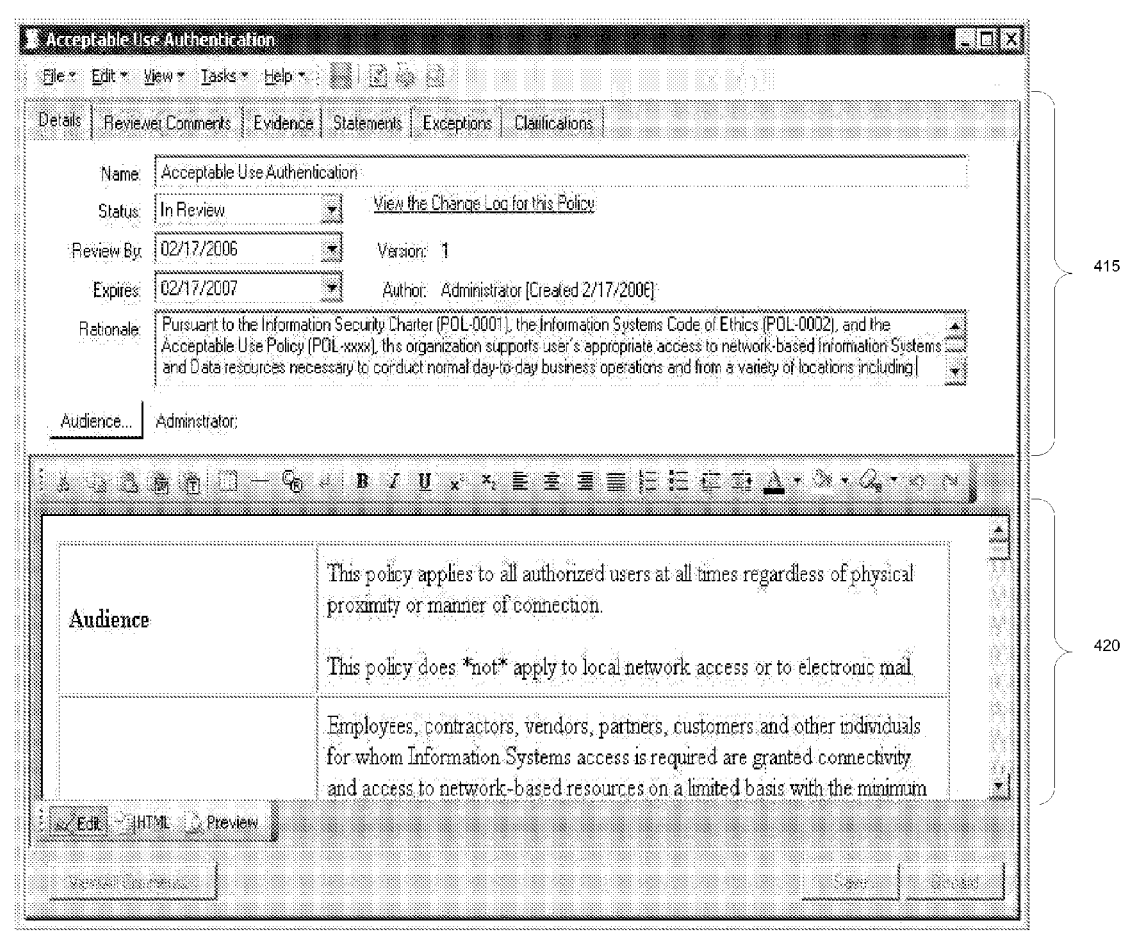

FIG. 4b illustrates an example of a policy editor interface, embodying aspects of the present invention. Frame 415 of the policy editor provides identification, status, pertinent dates, and rationale fields for the policy. Information for these fields can be provided by the user for new policies or retrieved from a policy storage area upon selection of the policy in the policy browser. Frame 420 provides an editable area wherein the user can view or provide details related to the policy. Details can include target audience and how that target audience should implement the policy. The illustrated policy editor can provide other functionality such as, for example, enabling reviewer comments, reviewing evidence of compliance collected from the enterprise, statements related to the policy, exceptions to the policy, and clarifications related to any ambiguities in the policy. All information entered regarding the policy can be stored from within the interface.

Figure 4C:
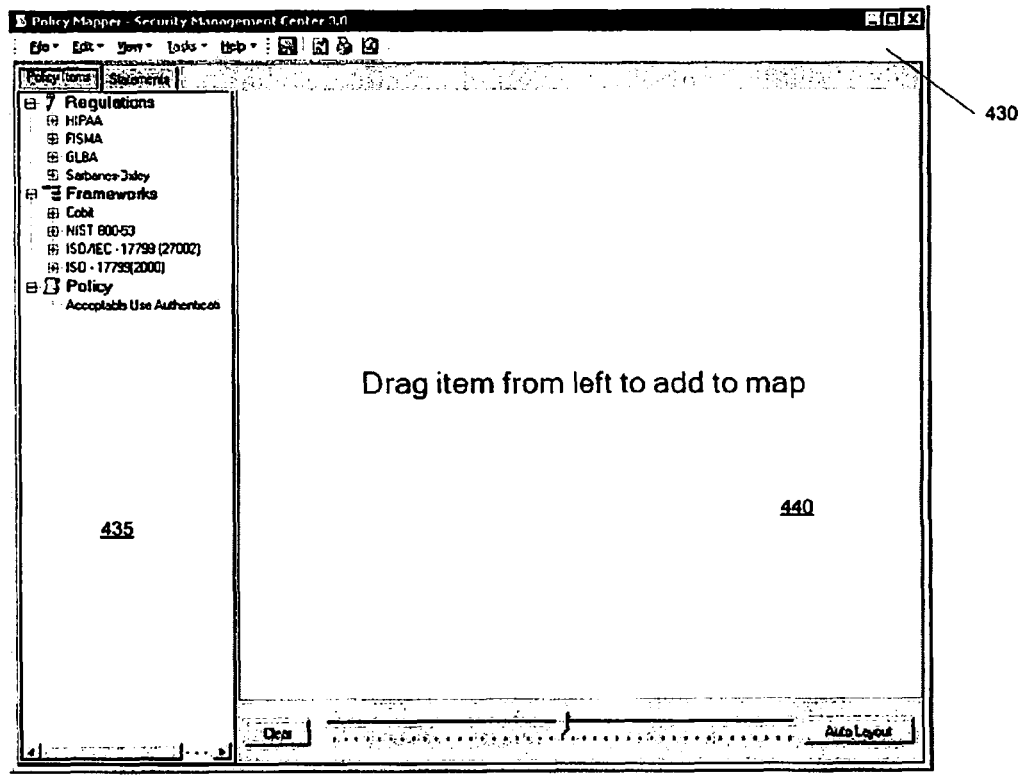

FIG. 4c illustrates an example of a policy mapper interface 430, embodying aspects of the present invention. Frame 435 includes a listing of all "policy items" having information stored by the system. The illustrated policy items include regulations, frameworks, and any created policies. By expanding the regulations and frameworks shown, all control statements related to those regulations and frameworks are available to the user. Frame 440 is a mapping frame that can be used to create the links between policies and control statements.

Figure 4D:
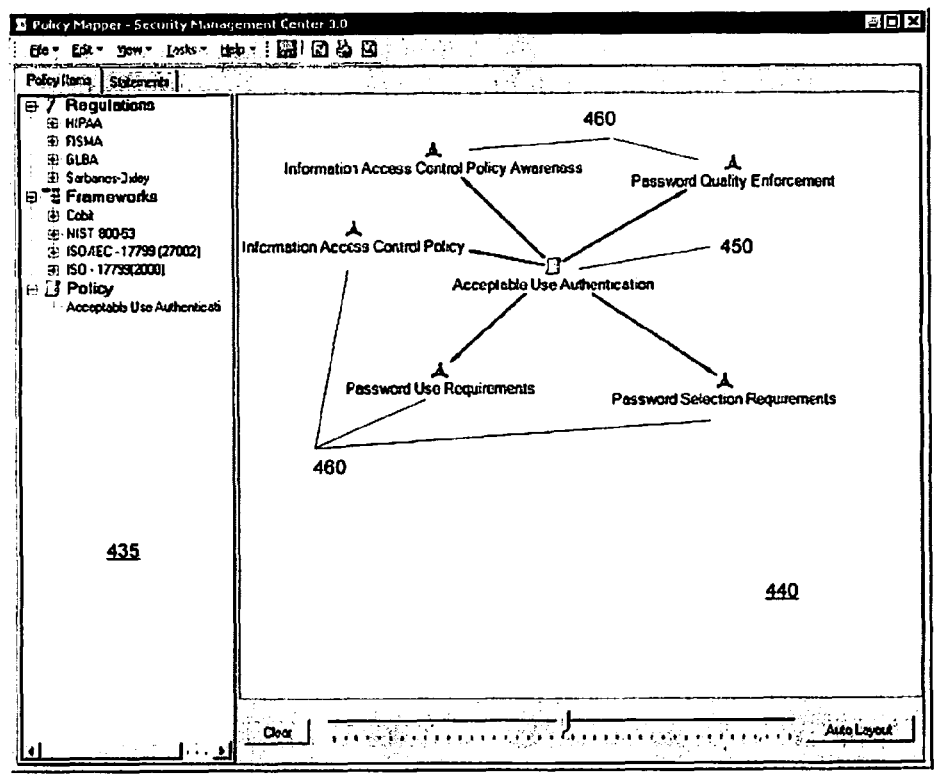

FIG. 4d illustrates an example of using the policy mapper interface 430 to create the links. The policy "Acceptable Use Authentication" 450 has been dragged to mapping frame 440 from policy items frame 435. In addition, all related control statements 460 have also been dragged to mapping frame 440 from policy items frame 435. Links between the policy and the control statements can be mapped by, for example, selecting policy 450 in the mapping frame and connecting the policy to one or more of control statements 460 (e.g., using a mouse to click on the policy and then drag over to the control statement). These links between the policy and the various control statements can then be stored from within the interface.

Other uses for such a graphical user interface can include displaying names of all control statements. The display can highlight (e.g., use bold face) those control statements that have associated policies, thus making it straightforward to determine those control statements that require additional policies to be created, or at least have a link created if an existing policy satisfies the control statement.

Once finalized, policies can then be published to all users responsible for implementing policies through a network to appropriate network nodes coupled to that network. A system can also be implemented on the network for periodically automatically auditing network nodes that should be compliant with regulations and/or best practices through the use of agents installed on those various network nodes. Data retrieved from such audits can then be analyzed to determine whether all appropriate control statements are indeed being satisfied, and, if not, flagging those control statements and their associated policies for follow-up.

As shown above, the present invention can be implemented using a variety of computer systems and networks. An example of one such computing and network environment is described below with reference to FIGS. 5 and 6.

An Example Computing and Network Environment

As shown above, the present invention can be implemented using a variety of computer systems and networks. An example of one such computing and network environment is described below with reference to FIGS. 5 and 6.

Figure 5:
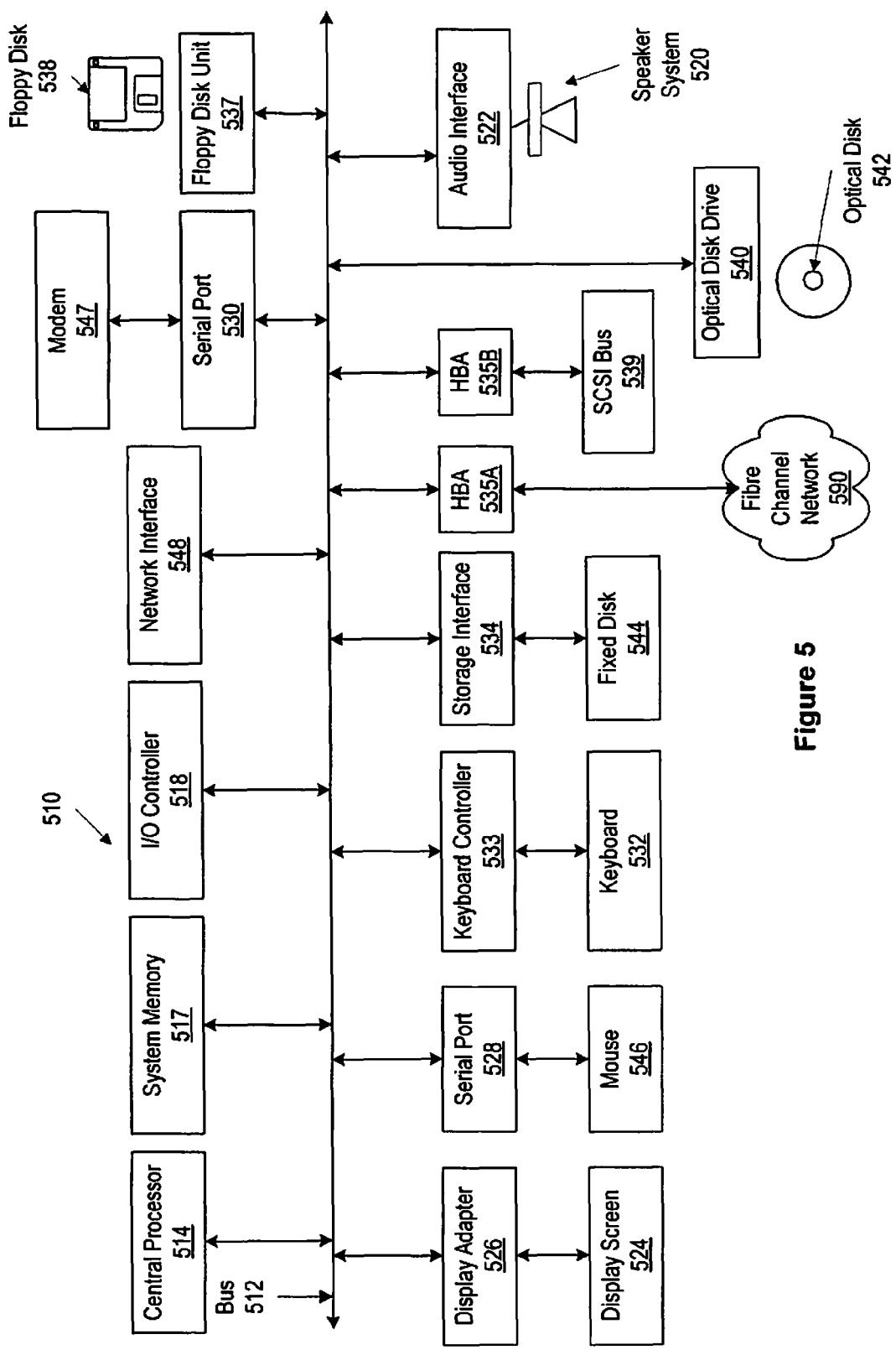
FIG. 5 depicts a block diagram of a computer system suitable for implementing embodiments of the present invention.

FIG. 5 depicts a block diagram of a computer system 510 suitable for implementing the present invention. Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk drive 537 operative to receive a floppy disk 538, a host bus adapter (HBA) interface card 535A operative to connect with a fibre channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 510 are generally stored on and accessed via a computer readable medium, such as a hard disk drive (e.g., fixed disk 544), an optical drive (e.g., optical drive 540), a floppy disk unit 537, or other storage medium.

Storage interface 534, as with the other storage interfaces of computer system 510, can connect to a standard computer readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an Internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 5 need not be present to practice the present invention. The devices and subsystems can be interconnected in different ways from that shown in FIG. 5. The operation of a computer system such as that shown in FIG. 5 is readily known in the art and is not discussed in detail in this application. Code to implement the present invention can be stored in computer-readable storage media such as one or more of system memory 517, fixed disk 544, optical disk 542, or floppy disk 538. Additionally, computer system 510 can be any kind of computing device using an operating system that provides necessary data access features and capabilities.

Figure 6:
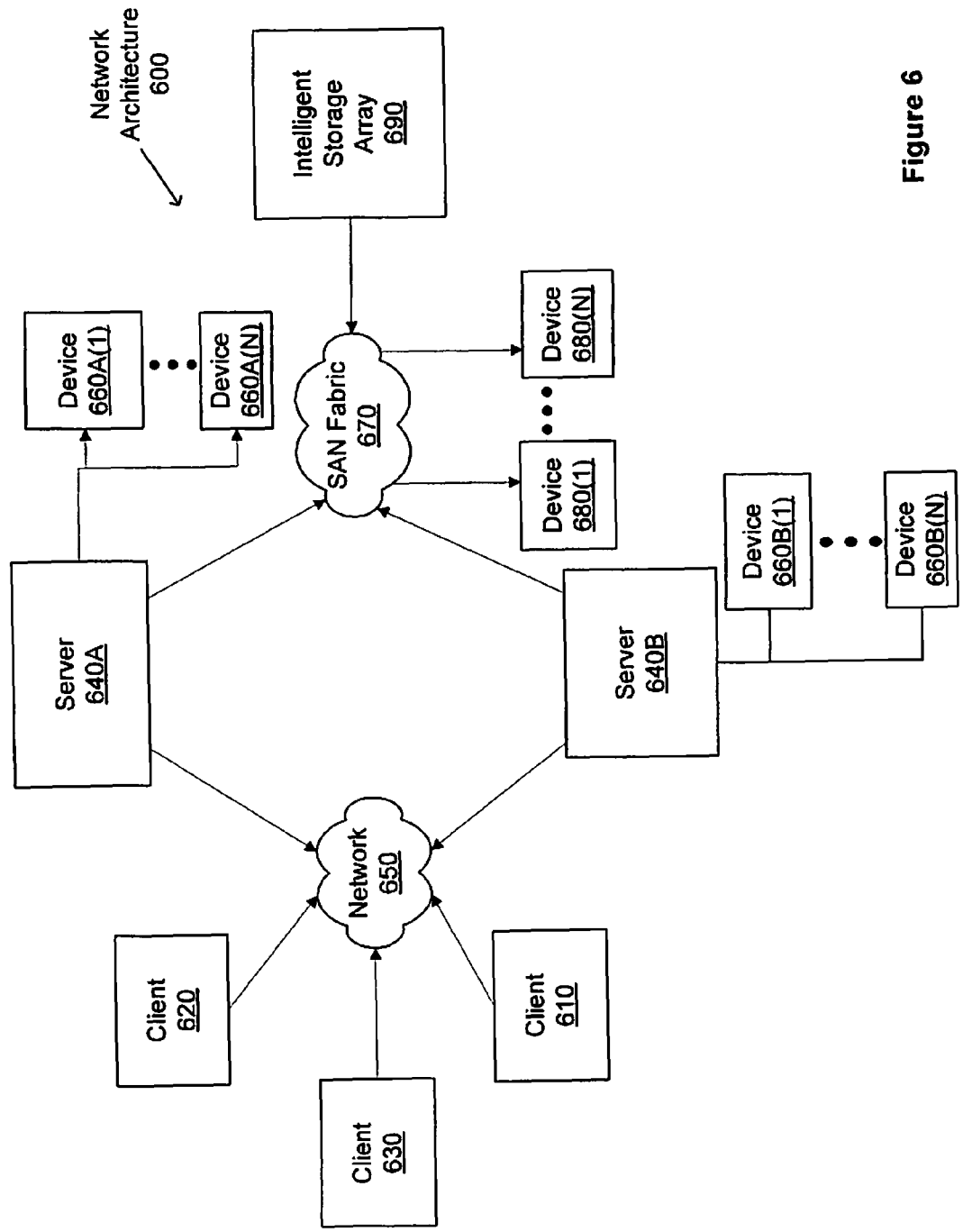
FIG. 6 is a block diagram depicting a network architecture suitable for implementing embodiments of the present invention.

FIG. 6 is a block diagram depicting a network architecture 600 in which client systems 610, 620 and 630, as well as storage servers 640A and 640B (any of which can be implemented using computer system 510), are coupled to a network 650. Storage server 640A is further depicted as having storage devices 660A(1)-(N) directly attached, and storage server MOB is depicted with storage devices 660B(1)-(N) directly attached. Storage servers 640A and 640B are also connected to a SAN fabric 670, although connection to a storage area network is not required for operation of the invention. SAN fabric 670 supports access to storage devices 680(1)-(N) by storage servers 640A and 640B, and so by client systems 610, 620 and 630 via network 650. Intelligent storage array 690 is also shown as an example of a specific storage device accessible via SAN fabric 670.

With reference to computer system 510, modem 547, network interface 548 or some other method can be used to provide connectivity from each of client computer systems 610, 620 and 630 to network 650. Client systems 610, 620 and 630 are able to access information on storage server 640A or 640B using, for example, a web browser or other client software (not shown). Such a client allows client systems 610, 620 and 630 to access data hosted by storage server 640A or 640B or one of storage devices 660A(1)-(N), 660B(1) (N), 680(1)-(N) or intelligent storage array 690. FIG. 6 depicts the use of a TCP/IP network for exchanging data, but the present invention is not limited to any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 510). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A computer-implemented method comprising:
storing a control statement in a computer-readable storage medium of a computer system;
linking a policy to the control statement by creating a link between the policy and the control statement, wherein
the link comprises a mapping between the policy and the control statement, and
the policy is configured to implement the control statement;
storing the policy and an identifier of the link in the computer-readable storage medium, wherein
the identifier comprises a record in a relational database;
mapping the control statement to an operational guideline of a plurality of operational guidelines, wherein
the control statement is configured to operate as an interface between the operational guideline and the policy,
the operational guideline comprises at least one of a regulation, best practice, or a standard, and
the control statement is one of a set of control statements formulated to ensure compliance with the operational guideline;
defining the control statement, wherein said defining the control statement further comprises
reducing the at least one regulation, best practice, or standard to one or more basic concepts comprising the at least one regulation, best practice or standard, and
expressing the one or more basic concepts in an atomic form; and
displaying a list of control statements linked to the policy on a display of the computer system, wherein
the list of control statements comprises the control statement.

2. The method of claim 1 further comprising:
defining the policy in response to the control statement, wherein said defining the policy further comprises
determining a presence of an asset implicated by the control statement, and
expressing an implementation of the control statement for the asset.

3. The method of claim 1 further comprising:
tracking an indication of members of the set of control statements that are not linked to a corresponding policy.

4. The method of claim 3 further comprising:
displaying an indication of each control statement not linked to the corresponding policy.

5. The method of claim 3 further comprising:
for each of the members, displaying an indication of a corresponding operational guideline of the plurality of operational guidelines.

6. A system comprising:
a first memory wherein the first memory is configured to store a control statement;
a second memory wherein the second memory is configured to store a policy;
a processor, coupled to the first memory and the second memory, and configured to execute instructions for
linking the policy to the control statement by creating a link between the policy and the control statement, wherein the link comprises a mapping between the policy and the control statement, and the policy is configured to implement the control statement, storing the policy and an identifier of the link, wherein the identifier comprises a record in a relational database, and mapping the control statement to an operational guideline of a plurality of operational guidelines, wherein the control statement is configured to operate as an interface between the operational guideline and the policy, the operational guideline comprises at least one of a regulation, best practice, or a standard, and the control statement is one of a set of control statements formulated to ensure compliance with the operational guideline;

defining the control statement, wherein said defining the control statement further comprises reducing the at least one regulation, best practice, or standard to one or more basic concepts comprising the at least one regulation, best practice or standard, and expressing the one or more basic concepts in an atomic form; and a display configured to display a list of control statements linked to the policy, wherein the list of control statements comprises the control statement.

7. The system of claim 6 wherein said instructions for storing the indication of the link further comprise:

instructions for storing the indication of the link in the second memory.

8. The system of claim 6 wherein the processor is further configured to execute instructions comprising:

defining the policy in response to the control statement, wherein said instructions for defining the policy further comprise instructions for determining a presence of an asset implicated by the control statement, and expressing an implementation of the control statement for the asset.

9. The system of claim 6 wherein the processor is further configured to execute instructions comprising:

tracking an indication of members of the set of control statements that are not linked to a corresponding policy.

10. The system of claim 9 wherein the processor is further configured to execute instructions comprising:

displaying an indication of each control statement not linked to the corresponding policy.

11. The system of claim 9 wherein the processor is further configured to execute instructions comprising:

for each member, displaying an indication of a corresponding operational guideline of the plurality of operational guidelines.

12. An apparatus comprising:

means for storing a control statement in a computer-readable storage medium of a computer system;

means for linking a policy to the control statement by creating a link between the policy and the control statement, wherein the link comprises a mapping between the policy and the control statement, and the policy is configured to implement the control statement;

means for storing the policy and an identifier of the link in the computer-readable storage medium, wherein the identifier comprises a record in a relational database;

means for mapping the control statement to an operational guideline of a plurality of operational guidelines, wherein the control statement is configured to operate as an interface between the operational guideline and the policy, the operational guideline comprises at least one of a regulation, best practice, or a standard, and the control statement is one of a set of control statements formulated to ensure compliance with the operational guideline;

means for defining the control statement, wherein said defining the control statement further comprises reducing the at least one regulation, best practice, or standard to one or more basic concepts comprising the at least one regulation, best practice or standard, and expressing the one or more basic concepts in an atomic form; and means for displaying a list of control statements linked to the policy on a display of the computer system, wherein the list of control statements comprises the control statement.

13. The apparatus of claim 12 further comprising:

means for defining the policy in response to the control statement, wherein said means for defining the policy further comprises means for determining a presence of an asset implicated by the control statement, and means for expressing an implementation of the control statement for the asset.

14. The apparatus of claim 12 further comprising:

means for tracking an indication of members of the set of control statements that are not linked to a corresponding policy.

15. The apparatus of claim 14 further comprising:

means for displaying an indication of each control statement not linked to the corresponding policy.

16. The apparatus of claim 14 further comprising:

means for displaying, for each member, an indication of a corresponding operational guideline of the plurality of operational guidelines.

17. The method of claim 1 further comprising:

mapping the control statement to a second operational guideline.

* * * * *